Figure 1:
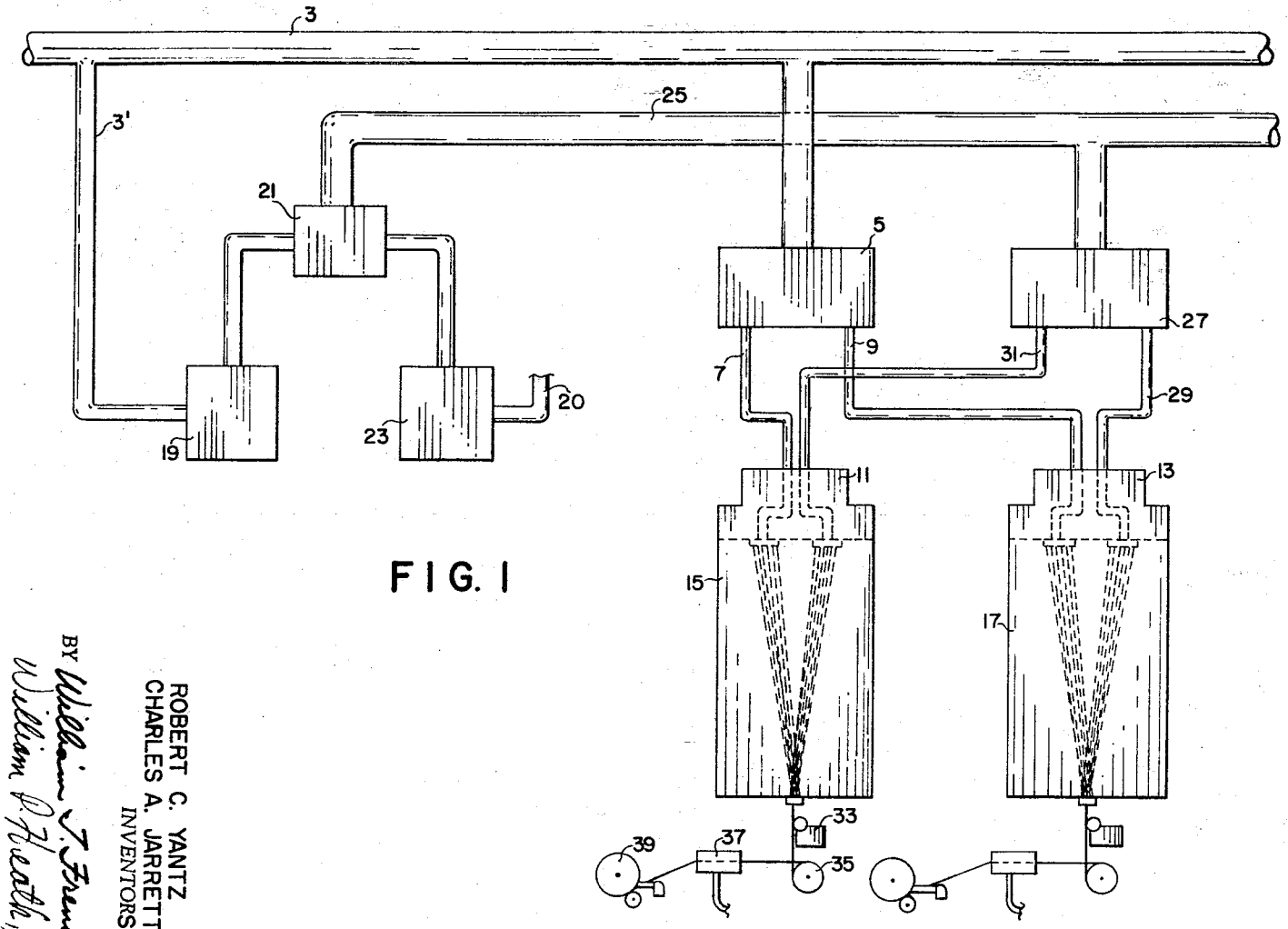
Figure 2:
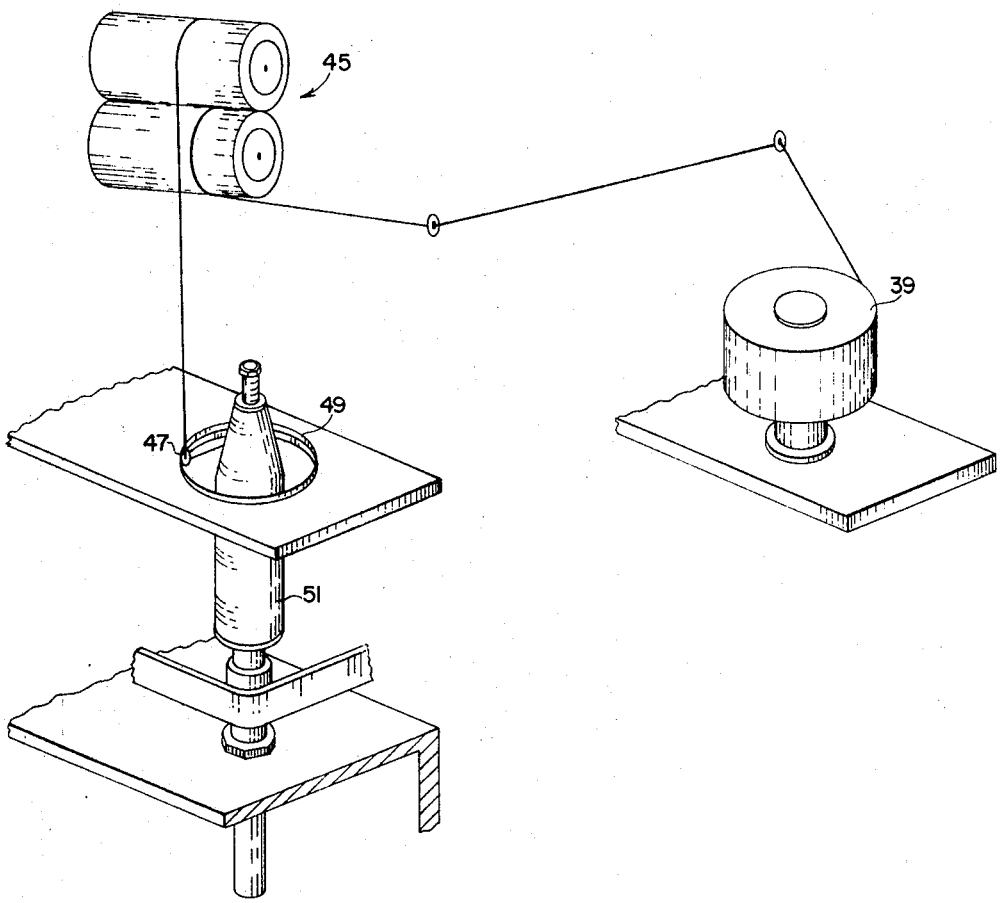

T868011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 18, 1969

868 O.G. 730

840,133

PROCESS FOR PRODUCING HEATHER YARN

Robert C. Yantz, 1216 Radcliffe Ave. 37664, and Charles A. Jarrett, 2245 Sunningdale Road 37660, both of Kingsport, Tenn.

Continuation of application Ser. No. 713,678, Mar. 18, 1968. This application July 2, 1969. Published Nov. 18, 1969

Int. Cl. D02g *1/02*

U.S. Cl. 264—103

2 Sheets Drawing. 7 Pages Specification

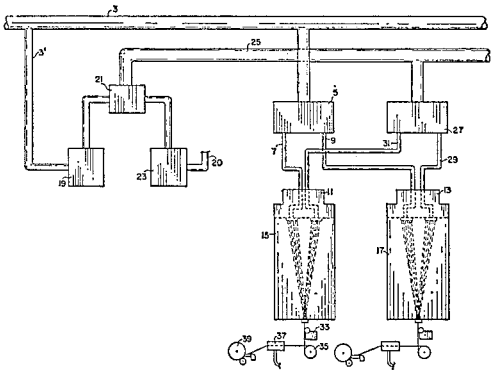

Process for manufacturing yarns having a heather color effect comprising spinning two groups of filaments which are of different colors or shades in a single spinning cabinet, forming the filaments into a single strand, and further intermingling the filaments by means of a mixing jet.

T 868011

840133
DEF. PUB.

Nov. 18, 1969

R. C. YANTZ ET AL

PROCESS FOR PRODUCING HEATHER YARN

Original Filed March 18, 1968

2 Sheets-Sheet 1

ROBERT C. YANTZ
CHARLES A. JARRETT
INVENTORS

BY William T. French
William P. Heath, Jr.
ATTORNEYS

T868011

840133
DEF. PUB.

Nov. 18, 1969 R. C. YANTZ ET AL

PROCESS FOR PRODUCING HEATHER YARN

Original Filed March 18, 1968 2 Sheets-Sheet 2

ROBERT C. YANTZ
CHARLES A. JARRETT
INVENTORS

BY William J. French
William P. Heath, Jr
ATTORNEYS